United States Patent [19]
Priest

[11] 3,787,004
[45] Jan. 22, 1974

[54] SPINDLE BRAKING MECHANISM FOR MICROFILM READER
[75] Inventor: Lyle Gilbert Priest, Palo Alto, Calif.
[73] Assignee: Information Design, Inc., Menlo Park, Calif.
[22] Filed: June 30, 1972
[21] Appl. No.: 268,095

[52] U.S. Cl. .................... 242/204, 74/810, 274/4 D
[51] Int. Cl. ........................ B11b 15/32, G03b 1/04
[58] Field of Search .................. 242/200–204, 67.4; 274/4 D; 74/417, 810, 665

[56] References Cited
UNITED STATES PATENTS
3,117,739  1/1964  Unterborn ......................... 242/201
2,624,214  1/1953  Arensberg ........................... 74/665
3,201,681  9/1965  Schober .............................. 242/204
3,528,628  9/1970  Wangerin ........................... 242/201
3,545,766  12/1970  Osborn .............................. 274/4 D Primary Examiner—Leonard D. Christian

[57] ABSTRACT

A spindle braking mechanism for microfilm readers and the like comprising a pair of spindles either one of which may be driven from a common drive shaft through pairs of helical gears producing a thrust on the drive shaft which is proportional to the driving torque. This thrust is utilized to control the braking force of uni-directional braking devices, one such device being applied to each spindle to avoid overrun.

5 Claims, 2 Drawing Figures

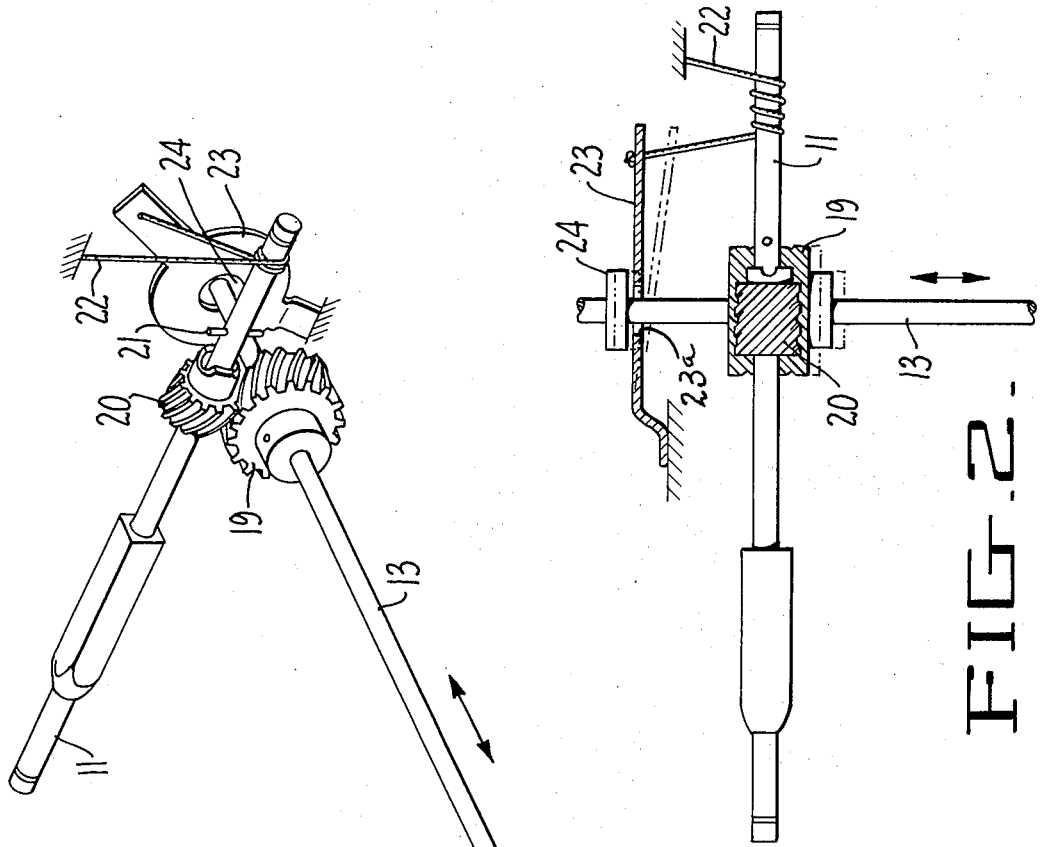
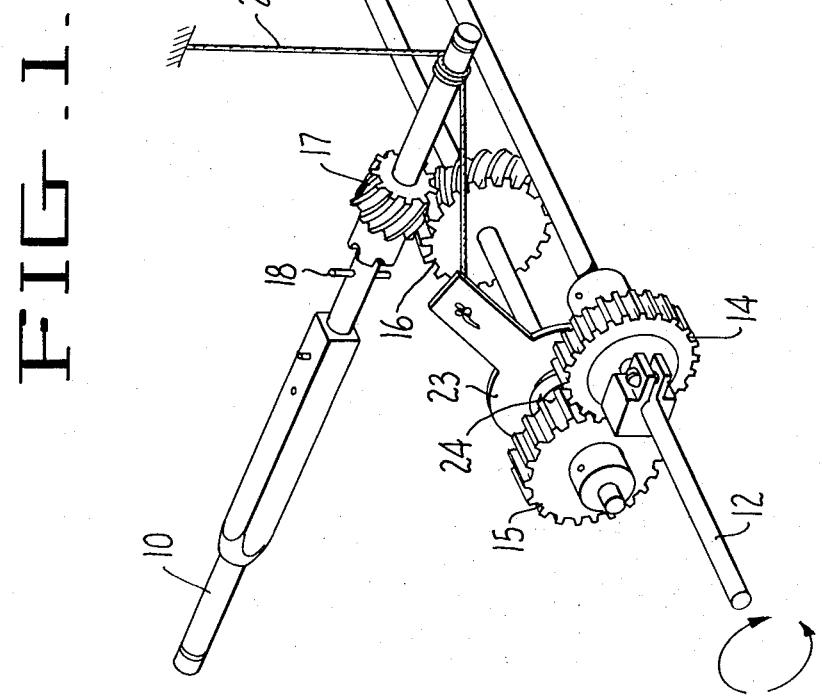

SPINDLE BRAKING MECHANISM FOR MICROFILM READER

BACKGROUND

This invention relates generally to microfilm readers which transport film between two reels (or between a cartridge and a reel). One common problem of such devices is that considerable slack or "spooling" is produced as a result of overrun when the drive power employed to rotate the spindle is interrupted. The problem is notoriously severe after high speeds of spindle rotation.

The problem of "spooling" is usually solved by introducing a constant friction on both spindles to which the tape reels are mounted. But since the outside diameter of each film roll typically varies (usually in a ratio from 3 to 1 depending on whether the spool is full or empty) the driving torque required to overcome the friction forces may vary in a ratio from about 9 to 1. Furthermore, inasmuch as the braking friction of conventional devices are designed to meet maximum requirements, considerably more driving power is required than would otherwise be necessary if only the required friction forces are applied. Another disadvantage to the use of constant friction is that greater speeds of film travel result in high film tension and this can cause film damage or breakage.

It is recognized that the foregoing problems have been previously solved in dynamic tensioning and braking systems such as commonly employed in high performance tape transports and cameras. Such devices, however, are considered too expensive for microfilm readers.

In brief, the present invention provides a simple braking mechanism for microfilm readers and the like comprising a pair of spindles for supporting a pair of tape reels which, like prior art devices, may be selectively connected to a drive shaft. The invention, however, utilizes a pair of uni-directional braking devices, one device being connected to each spindle, the braking force of these devices being applied to its connected spindle when the other spindle or neither spindle is connected to the drive shaft. In addition, means responsive to a driving torque imparted to one spindle regulates the braking force applied to the other spindle as to avoid spooling.

One principal object of the present invention is to provide an improved braking mechanism for microfilm readers and the like.

A second object of the invention is to provide a braking mechanism of the kind described wherein only the required braking force is applied.

A still further object of the invention is to provide an inexpensive braking mechanism for devices of the kind described.

Other objects of the present invention will become apparent in view of the following detailed description.

In the drawings forming a part of this application and in which like parts are identified by like reference numerals, FIG. 1 is a perspective view of one embodiment of the invention; and FIG. 2 is an enlarged detail of a portion of the mechanism shown in FIG. 1.

Referring to FIG. 1 in particular, a pair of reel spindles 10 and 11 are provided, and these spindles support two reels of a microfilm reader. Either one of the spindles 10 or 11 may be driven by a motor driven power shaft 12 by an axially movable drive shaft 13 through a pair of gears 14 and 15. Spindle 10 is driven from drive shaft 13 through helical gears 16 and 17 but only when gear 17 is clutched to the spindle 10 by means of a pin 18. Pin 18 engages a slot provided in the hub of gear 17, and this engagement is made when helical gear 16 is rotated counter-clockwise as viewed in FIG. 1, forcing gear 17 to slide toward the left.

Spindle 11 is adapted to be driven off drive shaft 13 through gearing that is identical to that used for spindle 10. In this connection, a second pair of helical gears 19 and 20 are provided, gear 20 being slidable on spindle 11 and having a slot for engaging a pin 21. It will be readily apparent that a counter-clockwise movement of drive shaft 13 disengages gear 20 from pin 21 while simultaneously causing gear 17 to engage pin 18. Conversely, a clockise rotation of drive shaft 13 clutches gear 20 to pin 21 while releasing gear 17 from the pin 18. Thus, the direction with which drive shaft 13 is rotated determines which spindle is driven and, therefore, the direction of film movement.

The present invention further contemplates the use of a pair of uni-directional braking devices and means responsive to a torque imparted to one of the spindles for regulating the braking force applied to the other spindle. Each uni-directional braking device comprises a flexible cord 22 and a leaf spring 23. The cord of each device is wrapped around one of the spindles, one end of the cord being secured (as to a frame, not shown) and the other end being connected to the leaf spring.

Referring to FIG. 2, each leaf spring is formed with an opening 23a that receives the drive shaft 13 therethrough and allows axial, reciprocal movement, indicated by directional lines. A pair of contact members 24 connected to drive shaft 13 is positioned adjacent leaf springs 23 and engage those springs, depending upon the axial position of the drive shaft. For example, a movement of drive shaft 13, as illustrated in FIG. 2, brings contact member 24 into engagement with leaf spring 23, moving the leaf spring into the broken line position shown. This reduces the braking force applied to spindle 11 through cord 22. Importantly, this regulation in the braking force applied to spindle 11 occurs only while spindle 10 is being driven. If spindle 11 is the driven spindle, rotation of spindle 11 is in a direction that overruns or "slips" cord 22 and no effective braking is accomplished.

It is to be understood that while a specific description has been given with respect to the operation of spindle 11, precisely the same uni-directional braking system is provided with respect to spindle 10. In both instances the braking forces are regulated or controlled by the instantaneous axial position of drive shaft 13, and this is determined by which set of helical gears (16, 17 or 19, 20) are driving as well as the amount of torque applied.

One typical example of operation will be explained in view of FIG. 1.

Assuming that power supplied to power shaft 12 rotates drive shaft 13 in a clockwise direction, gears 16 and 19 will tend to move gears 17 and 20 toward the right, maintaining a disengagement between gear 17 and pin 18 but causing a clutching of gear 20 to pin 21. Torque will then be applied to spindle 11 which becomes the driven spindle. Spindle 10, on the other hand, is free running except for whatever braking resistance is applied by the uni-directional braking device and the cord 22 wound thereon.

If we now further assume that spindle 11 requires a high torque to drive the tape, as during start up, greater forces will be transmitted through helical gears 19 and 20. The contact between these gears is such that gear 19 tends to push off from gear 20. This action is translated into an axial movement of drive shaft 13, bringing the contact member 24 against spring 23 of the uni-directional braking device connected to spindle 10 and relieving the tension in the associated cord 22. Simultaneously, the resiliency of spring 23 tends to return drive shaft 13 to its original or centered position of start.

A reduction in the torque required by spindle 11 reduces the contact forces between gears 19 and 20. The stored tension in spring 23, acting against contact member 24, returns the drive shaft to the right, as shown. This increases the braking force, a maximum force being achieved when contact member 24 no longer engages spring 23.

Although a preferred embodiment of this invention is illustrated and described, various modifications and changes may be resorted to without departing from the spirit of the invention or the scope of the attached claims and each of such modifications and changes is contemplated.

What is claimed is:

1. A spindle braking mechanism for microfilm readers and the like comprising: a pair of spindles for supporting a pair of tape reels; a drive shaft; means for selectively connecting either one of said spindles to said drive shaft; a pair of uni-directional braking devices connected to said spindles, respectively, the braking force of one uni-directional braking device being applied to its connected spindle when the other spindle or neither spindle is connected to said drive shaft; and means responsive to a torque imparted to the drive shaft connected spindle for regulating the braking force applied by the uni-directional braking device connected to the other spindle.

2. The mechanism of claim 1, each uni-directional braking device comprising a flexible cord and a spring, said cord being wrapped around the connected spindle, one end of said cord being secured and the other end connected to said spring.

3. The mechanism of claim 2, the spring of each uni-directional braking device being a leaf spring having an opening that receives said drive shaft therethrough, said spring being secured on one side of said opening and connected to said cord on an opposite side, said means for regulating the braking force including a contact member secured to said drive shaft and engagable with said spring upon axial movement of said drive shaft in one direction.

4. The mechanism of claim 2, said drive shaft being axially movable, and said means for varying the braking force comprising: a first pair of helical gears connected to said drive shaft, a second pair of helical gears connected to said spindles and adapted to be engaged with said first helical gears, respectively; and contact means secured to said drive shaft and engagable with the spring of each uni-directional braking device for releasing resilient tension in said cord in an amount proportional to the torque applied to the driven spindle.

5. The mechanism of claim 1, said drive shaft being axially movable, and said means for varying the braking force comprising a first pair of helical gears connected to said drive shaft, a second pair of helical gears connected to said spindles and adapted to be engaged with said first helical gears, respectively; and means for releasing the braking force in an amount proportional to the torque applied to the driven spindle through engaged helical gears.

* * * * *